US008373298B2

(12) United States Patent
Barber (10) Patent No.: US 8,373,298 B2
(45) Date of Patent: Feb. 12, 2013

(54) ELECTRICAL GENERATOR FOR WIND TURBINE

(76) Inventor: Gerald L. Barber, Greenville, SC (US)

( * ) Notice: Subject to any disclaimer, the term of this patent is extended or adjusted under 35 U.S.C. 154(b) by 367 days.

(21) Appl. No.: 12/815,542

(22) Filed: Jun. 15, 2010

(65) Prior Publication Data

US 2010/0264667 A1 Oct. 21, 2010

Related U.S. Application Data

(63) Continuation-in-part of application No. 12/499,206, filed on Jul. 8, 2009, now Pat. No. 8,164,212, and a continuation-in-part of application No. 12/492,187, filed on Jun. 26, 2009, now Pat. No. 8,174,142, and a continuation-in-part of application No. 12/432,837, filed on Apr. 30, 2009, now Pat. No. 7,825,532, and a continuation-in-part of application No. 12/426,494, filed on Apr. 20, 2009, now Pat. No. 8,109,727.

(51) Int. Cl.
*F03D 9/00* (2006.01)
*H02P 9/04* (2006.01)
*H02K 7/09* (2006.01)

(52) U.S. Cl. ............................ 290/55; 290/44; 310/90.5

(58) Field of Classification Search .................... 290/44, 290/55; 310/90.5
See application file for complete search history.

(56) References Cited

U.S. PATENT DOCUMENTS

| | | | | |
|---|---|---|---|---|
| 1,233,232 A | 7/1917 | Heyroth | ............................ | 290/55 |
| 1,352,960 A | 9/1920 | Heyroth | ............................ | 290/44 |
| 1,944,239 A | 1/1934 | Hermann | ........................ | 290/55 |
| 2,827,580 A | 3/1958 | Jaeschke | ........................ | 310/105 |
| 3,473,852 A * | 10/1969 | Lyman | ........................ | 310/90.5 |
| 3,510,149 A | 5/1970 | Raidel | ........................ | 280/86.75 |
| 3,529,193 A | 9/1970 | Lindstedt | ........................ | 310/264 |
| 3,761,148 A * | 9/1973 | Grosbard | ........................ | 310/90.5 |
| 3,976,339 A * | 8/1976 | Sabnis | ........................ | 310/90.5 |
| 4,003,676 A | 1/1977 | Sweeney et al. | ............. | 416/132 B |
| 4,088,352 A | 5/1978 | Kling | ............................ | 290/55 |
| 4,090,745 A * | 5/1978 | Dohogne et al. | ............. | 310/90.5 |
| 4,111,601 A | 9/1978 | Richard | ........................ | 416/41 |
| 4,154,489 A * | 5/1979 | Lyman | ........................ | 310/90.5 |
| 4,211,452 A * | 7/1980 | Poubeau | ........................ | 310/90.5 |
| 4,268,095 A * | 5/1981 | Millner | ........................ | 310/90.5 |
| 4,289,970 A | 9/1981 | Deibert | ........................ | 290/44 |
| 4,330,714 A | 5/1982 | Smith | ............................ | 290/55 |
| 4,350,895 A | 9/1982 | Cook | ............................ | 290/55 |
| 4,363,525 A * | 12/1982 | Poubeau | ........................ | 310/90 |
| 4,364,708 A | 12/1982 | David | ........................ | 416/132 B |
| 4,367,413 A | 1/1983 | Nair | ............................ | 290/52 |
| 4,417,853 A | 11/1983 | Cook | ........................ | 416/132 B |
| 4,470,644 A * | 9/1984 | Weisser | ........................ | 310/90.5 |
| 4,483,570 A * | 11/1984 | Inoue | ........................ | 310/90.5 |
| 4,548,546 A | 10/1985 | Lardellier | ........................ | 415/133 |

(Continued)

FOREIGN PATENT DOCUMENTS

EP 0015131 9/1980
GB 2 100 688 1/1983

(Continued)

OTHER PUBLICATIONS

International Search Report and Written Opinion dated Jul. 2, 2010.

(Continued)

*Primary Examiner* — Pedro J Cuevas
(74) *Attorney, Agent, or Firm* — Thomas/Horstemeyer, LLP (57) ABSTRACT

A wind turbine or other rotary device for generating electricity has its outer perimeter constructed with coils that form a rotor (26) of an electrical generator. A stator assembly (52) is positioned at the lower perimeter of the path of the rotor and includes stator halves that are juxtaposed the moving rotor for generating electricity. The stator halves include magnetic bearings that provide substantially no contact between the rotor and the stator, allowing the rotor to move with a minimum of resistance.

21 Claims, 12 Drawing Sheets

U.S. PATENT DOCUMENTS

| | | | | |
|---|---|---|---|---|
| 4,619,585 A | | 10/1986 | Storm | 416/132 B |
| 4,652,780 A | * | 3/1987 | Murakami et al. | 310/90.5 |
| 4,700,094 A | * | 10/1987 | Downer et al. | 310/90.5 |
| 4,720,640 A | | 1/1988 | Anderson et al. | 290/43 |
| 4,729,716 A | | 3/1988 | Schmidt | 416/10 |
| 5,140,209 A | * | 8/1992 | Whorlow | 310/90.5 |
| 5,142,175 A | * | 8/1992 | Watanabe | 310/90.5 |
| 5,216,308 A | * | 6/1993 | Meeks | 310/90.5 |
| 5,247,219 A | * | 9/1993 | Nakagawa et al. | 310/90.5 |
| 5,302,874 A | * | 4/1994 | Pinkerton | 310/90.5 |
| 5,315,159 A | | 5/1994 | Gribnau | 290/55 |
| 5,319,278 A | | 6/1994 | Myohga et al. | 310/323.12 |
| 5,428,290 A | | 6/1995 | Porcher | 324/207.16 |
| 5,469,006 A | * | 11/1995 | Pinkerton | 310/90.5 |
| 5,485,666 A | | 1/1996 | Welborn et al. | 29/436 |
| 5,600,195 A | | 2/1997 | Welborn et al. | 310/153 |
| 5,844,341 A | | 12/1998 | Spooner et al. | 310/112 |
| 5,925,952 A | * | 7/1999 | Bichler et al. | 310/74 |
| 6,064,123 A | | 5/2000 | Gislason | 290/55 |
| 6,091,161 A | | 7/2000 | Dehlsen et al. | 290/43 |
| 6,417,578 B1 | | 7/2002 | Chapman et al. | 290/44 |
| 6,710,489 B1 | * | 3/2004 | Gabrys | 310/90.5 |
| 6,836,028 B2 | | 12/2004 | Northrup et al. | 290/44 |
| 6,913,044 B2 | | 7/2005 | Zwehl et al. | 139/1 E |
| 6,951,443 B1 | | 10/2005 | Blakemore | 415/4.3 |
| 6,979,171 B2 | | 12/2005 | Lauritsen | 415/4.3 |
| 7,042,109 B2 | | 5/2006 | Gabrys | 290/44 |
| 7,098,552 B2 | | 8/2006 | McCoin | 290/44 |
| 7,154,191 B2 | | 12/2006 | Jansen et al. | 290/55 |
| 7,154,193 B2 | | 12/2006 | Jansen et al. | 290/55 |
| 7,156,037 B2 | | 1/2007 | Borgen | 114/264 |
| 7,215,038 B2 | | 5/2007 | Bacon | 290/55 |
| 7,218,011 B2 | | 5/2007 | Hiel et al. | 290/43 |
| 7,331,762 B2 | | 2/2008 | Fraenkel | 416/85 |
| 7,345,377 B2 | | 3/2008 | Bacon | 290/55 |
| 7,358,624 B2 | | 4/2008 | Bacon | 290/55 |
| 7,372,172 B2 | | 5/2008 | Winkler et al. | 290/43 |
| 7,385,303 B2 | | 6/2008 | Roos | 290/54 |
| 7,385,305 B2 | | 6/2008 | Casazza et al. | 290/55 |
| 7,385,306 B2 | | 6/2008 | Casazza et al. | 290/55 |
| 7,417,334 B2 | | 8/2008 | Uchiyama | 290/55 |
| 7,425,772 B2 | | 9/2008 | Novo Vidal | 290/52 |
| 7,471,009 B2 | | 12/2008 | Davis et al. | 290/54 |
| 2003/0084951 A1 | | 5/2003 | Zwehl et al. | 139/11 |
| 2003/0137149 A1 | | 7/2003 | Northrup et al. | 290/44 |
| 2003/0168864 A1 | | 9/2003 | Heronemus et al. | 290/55 |
| 2003/0227174 A1 | | 12/2003 | Bayly | 290/55 |
| 2006/0012182 A1 | | 1/2006 | McCoin | 290/55 |
| 2006/0275121 A1 | | 12/2006 | Merswolke et al. | 416/132 B |
| 2007/0024060 A1 | | 2/2007 | Bacon | 290/55 |
| 2007/0166159 A1 | | 7/2007 | Williams | 416/10 |
| 2007/0200349 A1 | | 8/2007 | Bacon | 290/44 |
| 2007/0200350 A1 | | 8/2007 | Bacon | 290/44 |
| 2008/0003105 A1 | | 1/2008 | Nies | 416/95 |
| 2008/0253892 A1 | | 10/2008 | Dehlsen | 416/147 |
| 2008/0278019 A1 | | 11/2008 | Lu et al. | 310/156.32 |
| 2009/0096217 A1 | | 4/2009 | Watson | 290/55 |
| 2010/0133838 A1 | * | 6/2010 | Borgen | 290/52 |

FOREIGN PATENT DOCUMENTS

| | | |
|---|---|---|
| JP | 2009-030586 | 12/2009 |
| WO | WO 03/046376 | 6/2003 |

OTHER PUBLICATIONS

International Search Report and Written Opinion dated Jun. 30, 2010.
International Search Report and Written Opinion dated Jun. 15, 2010.
International Search Report and Written Opinion dated Jun. 18, 2010.
International Search Report and Written Opinion dated Jun. 16, 2010.

* cited by examiner

ELECTRICAL GENERATOR FOR WIND TURBINE

CROSS REFERENCE TO RELATED APPLICATION

This is a continuation-in-part of U.S. patent application Ser. No. 12/426,494, filed on Apr. 20, 2009 and of U.S. patent application Ser. No. 12/432,837, filed on Apr. 30, 2009.

FIELD OF THE INVENTION

This invention concerns an electrical generator using the perimeter of a wind turbine or other rotary device as a rotor of a generator and the stator that cooperates with the rotor to generate electricity.

BACKGROUND OF THE INVENTION

Windmills have been used for many generations for the purpose of pumping water from the ground and for generating electricity. The basic advantage of the windmill is that it uses the power of the wind to rotate a wheel having radially extending blades that are driven by the wind. This rotary movement is converted into various useful purposes. For example, wind turbines in the form of propellers mounted on towers have been placed in areas where steady winds are prevalent and the wind turbines are used to generate electricity.

The blades of the conventional wind turbines used for generating electricity are very large and made of expensive rigid material and are constructed to have the blades extend radially from a central hub, with no extra support at the outer tips of the blades. An electrical generator is mounted at the axis of the blades and the rotary motion of the blades turns the generator.

The conventional wind turbine blades rotate at a high rate of revolutions and must withstand both the centrifugal forces generated by the fast revolution of the blades and the cantilever bending forces applied to the blades by the wind. Since the outer portions of the blades move at a very high velocity and are engaged by strong winds, the larger the blades the stronger they must be and the more expensive they become. Thus, there is a practical limit as to the length and width of the blades because of the expense of stronger materials for larger blades.

Another type of wind turbine is one that has sailwings constructed of flexible material that are a substitute for the rigid blades of the conventional wind turbines described above. For example U.S. Pat. Nos. 4,330,714, 4,350,895, and 4,729,716 disclose wind turbines that do not use rigid propeller blades but use "sails" that catch the wind. The sails are mounted on radiating spars of the turbine. These particular wind turbines include circular inner and outer rims with the sails of the turbine supported by both the inner and outer rims. The outer rim supports the outer portions of the sails so that the force of the wind applied to the sails may be absorbed to a major extent by the outer rim so there is little if any cantilever force applied to the sails. This allows the blades of the wind turbine to be formed of lighter weight material, material that is not required to bear as much stress in comparison to the typical free bladed turbine.

The wind turbines of the patents cited above are constructed with an outer rail that extends circumferentially about the turbine wheel. Rubber tires or other rotary objects are placed in positions to engage the outer rail so as to rotate the rubber tires, with the driven tires in turn rotating the rotor of a generator. Thus, the rotation of the wind turbine is used to generate electricity. Several of the wheels/generator assemblies may be mounted, usually in an arc about the lower quadrant of the turbine wheel, taking advantage of the size and shape of a large wind turbine for increased electrical production. Also, some of the generators may be disconnected so as to vary the load applied to the wind turbine.

The prior art wind turbines as described above control the rate of rotation of the turbine wheel by turning the turbine wheel at angles with respect to the oncoming wind. Typically, the generators have an optimum speed range in which they operate, requiring the turbine wheel to rotate within a range of revolutions per unit of time. Also, the driving of a generator involves the application of rotary motion to the rotor of the generator and overcoming the drag and frictional forces required to operate the generator.

Thus, it would be desirable to produce and use a wind turbine or other rotary device that operates an electrical generator with a reduction in the drag and friction in the course of producing electricity, and to permit a wider range of rates of rotation of the turbine wheel while producing electricity.

SUMMARY OF THE DISCLOSURE

Briefly described, this disclosure concerns an electrical generator for a wheel that is mounted for rotation on a horizontal axis, the electrical generator including a circular rotor mounted on the wheel and extending concentrically about the horizontal axis for rotation with the wheel in a perimeter path about the horizontal axis. The circular rotor includes radially extending opposed sides, and a stator is positioned at the perimeter path of said rotor. The stator is shaped for receiving the rotor and is configured for generating electricity in response to the rotation of the rotor. Stator support means movably support the stator in response to lateral movements of said rotor at said stator, and a magnet is juxtaposed said rotor and is movable with said stator and is configured for maintaining said stator in juxtaposition with said rotor.

Another embodiment of the disclosure is an electrical generator for producing electricity that includes an annular rotor formed by a series of rotor segments, the rotor segments including coils with the rotor segments extending about a lateral axis of rotation and rotatable through an arc of an annular path. A stator is positioned at the arc of the annular path of the rotor segments, the stator including coils positioned on opposite sides of the arc of the annular path and shaped to receive therebetween the segments of said rotor, and magnet means for moving the stator laterally in response to lateral movements of the rotor.

A wind driven turbine is powered by atmospheric wind, and may be used to create rotary energy that is transformed into electricity. The support of the wind turbine may comprise an upright tower with the turbine wheel rotatably mounted on the tower about a laterally extending central axis. However, other rotary devices, such as water driven wheels and solar driven wheels may be used, if appropriate. They are sometimes referred to hereinafter as rotary wheels.

The rotary wheel may be mounted on a support about a laterally extending central axis. In the case of a wind turbine, a plurality of blades or sailwing assemblies are carried by the turbine wheel. The blades or sailwing assemblies may be formed of a flexible material, such as a sail cloth or fiberglass, extending radially from the central axis of the turbine wheel. Sail support cables may extend substantially parallel to the longitudinal axis of the sailwings. Shape control means may be used for adjusting the pitch, twist and shape of the sailwings or blades. The shape control means may include sail end supports attached to the opposed inner and outer ends of the sailwings for rotating one or both of the opposed ends of the sailwings for selectively imparting pitch and/or a longitudinal twist to the sailwing. Other shape control means for sail wings may include spreader bars positioned at intervals between the opposed ends of the sailwing for adjusting the distance between the support cables, trim cables extending from the sail supports to the cables for adjusting the configuration of the sailwing. A shape control means for sailwings is disclosed in more detail in parent application Ser. No. 12/426, 494, the disclosure of which is incorporated herein by reference. The blades of the turbine wheel may be formed of fiberglass or other material suitable in strength and durability for its intended function.

The wind turbine wheel includes an outer perimeter rail that can be used for both stabilizing and supporting the blades and the sailwings and for forming a rotor for a stator that together function as an electrical generator.

Also, an intermediate circular rail, concentric with the outer perimeter rail, may be used to mechanically drive an electrical generator at that position. The use of generators at the intermediate rail of the wind turbine allows the wind turbine to drive a generator at a slower speed than by the outer perimeter rail.

Other features and advantages of the structure and process disclosed herein may be understood from the following specification and accompanying drawings.

DETAILED DESCRIPTION

Figure 1A:
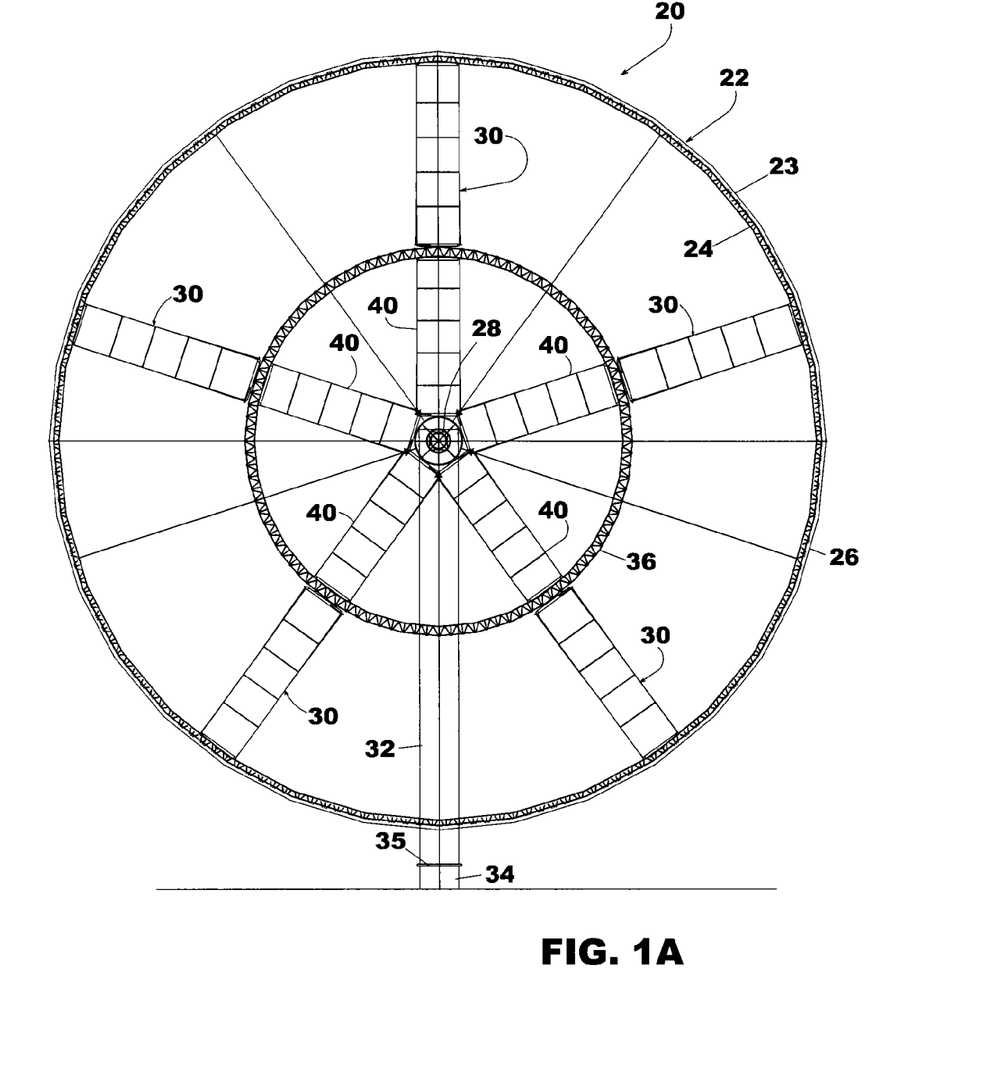
FIG. 1A is a front elevational view of a wind turbine.

Referring now in more detail to the drawings in which like numerals indicate like parts throughout the several views, FIG. 1 shows a wind turbine 20 that is designed for catching the wind and rotating for the purpose of generating electricity. The wind turbine includes a turbine wheel 22 having an outer perimeter 23 formed by a series of angle braces 24 and an outer perimeter circular rail 26 that extends continuously about the turbine wheel. The outer perimeter circular rail may be formed of arcuate segments and, as explained in more detail hereinafter, the perimeter rail may function as the rotor of an electrical generator.

An axle structure 28 is at the center of the turbine wheel 22 and a plurality of sailwing assemblies 30 are mounted to the axle structure 28 and extend radially toward the angle braces 24 that form the perimeter of the turbine wheel.

The turbine wheel may be mounted on an upright mast 32, and the mast is rotatably mounted on the ground support 34 by a yaw bearing 35. The mast 32 may be generally triangular in cross section, having one side of the triangle around its side facing the turbine wheel 22 and converging sides of the triangle trailing away from the rounded side. This shape provides a high bend resistance against the oncoming wind forces. Other cross sectional shapes of the mast may be used, as desired. A turning mechanism is provided (not shown) for rotating the mast 32 on its yaw bearing 35 with respect to the ground support 34 so as to turn the turbine wheel 22 into the wind.

In the embodiment illustrated in FIG. 1A, the turbine wheel 22 may include an intermediate support ring 36 which is concentric with the perimeter circular rail 26 and concentric with the axle structure 28. Both the outer perimeter circular rail 26 and intermediate support ring 36 rotate in unison about the axle structure.

Figure 2:
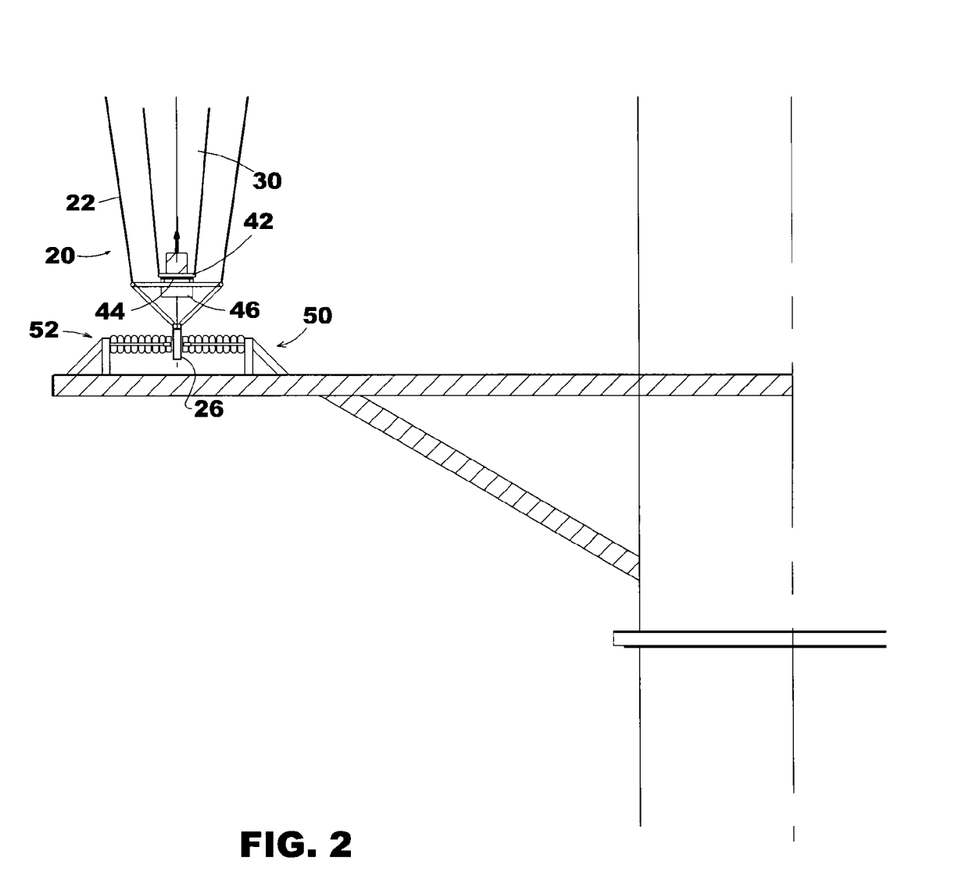
FIG. 2 is a side view, similar to FIG. 1B, but showing more details of the lower portion of the rotor and stator of the wind turbine.

Inner sailwings 40 may be supported between the axle structure 28 and the intermediate support ring 36, while the outer sailwings 30 may be supported between the intermediate support ring 36 and the outer perimeter circular rail 26. The outer and inner sailwings may be oriented at different angles with respect to the oncoming wind. For example, FIG. 2 shows outer sailwing 30 supported at its perimeter by a sail end support 42, with the sail end support 42 being supported by a slewing ring 44, with a motor 46 used to rotate the slewing ring and the sail end support. This type turning mechanism may be used to form a twist and/or pitch to the sailwings 30 and 40.

The electrical generator 50 is illustrated in FIGS. 2-5. The outer perimeter circular rail 26 functions as the rotor of the generator. A stator assembly 52 is mounted at the perimeter of the turbine wheel 22 and is positioned to receive the outer perimeter circular rail 26 that functions as the rotor of the generator. The rotor 26 is formed in arcuate segments about the perimeter of the turbine wheel, and each arcuate segment of the rotor includes its own coils.

Figure 4:
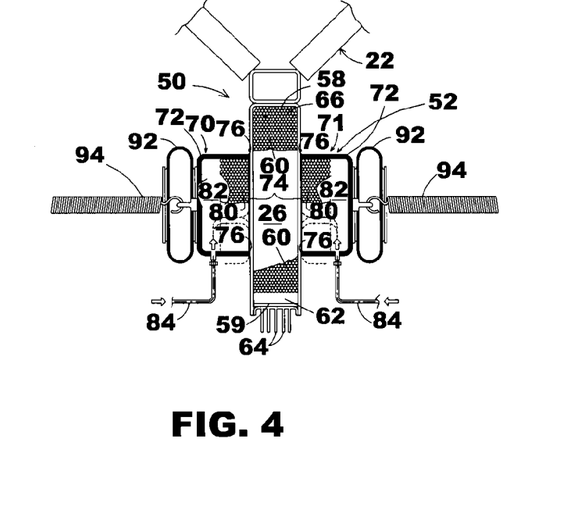
FIG. 4 is a close-up detailed view of the electrical generator, showing the outer perimeter rail that functions as a rotor of the generator at the bottom of its circular path, and showing the central portion of the stator.
Figure 5:
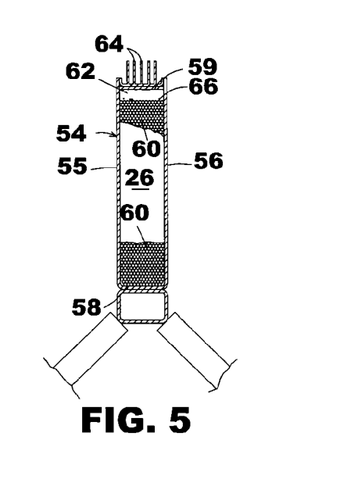
FIG. 5 is a cross-sectional view of the rotor inverted from FIG. 4.
Figure 6:
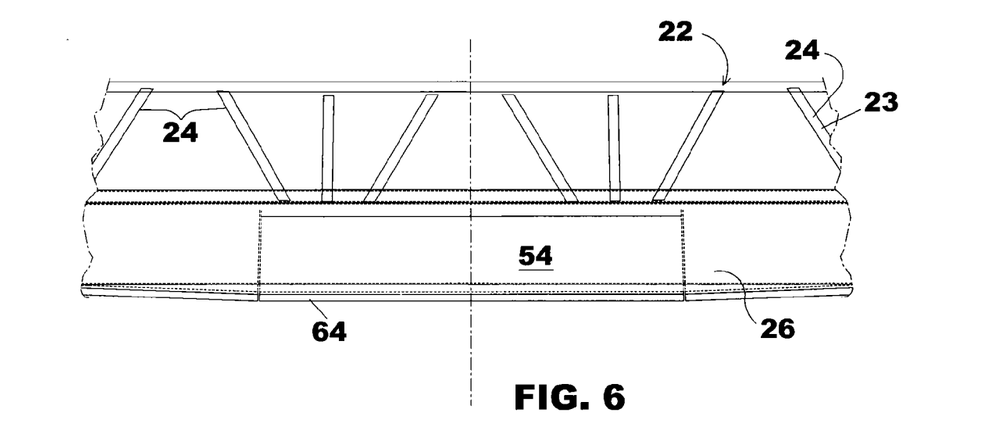
FIG. 6 is a side view of an outer perimeter rail that functions as a rotor for the electrical generator.

As shown in FIG. 5, the rotor segments each include the closed housing 54 having flat opposed side walls 55 and 56, inner end wall 58 and outer end wall 59. The electrical coils 60 are positioned in the closed housing with a space 62 formed between the coils 60 and the outer end wall 59. Cooling fins 64 extend from the outer end wall 59 for the purpose of extracting heat from the rotor 26. Also, a cooling liquid, such as oil 66, occupies some of the space about the coils 60. The cooling liquid 66 may not completely fill the inside of its rotor segment, leaving a space inside the rotor segment. As the turbine wheel rotates, the segments of the rotor 26 will be inverted with FIG. 4 showing a segment of the rotor at the lower arc of its rotation, and FIG. 5 showing a segment of the rotor when it is passing over the upper arc of its rotation. The cooling liquid 66 is influenced by gravity and by centrifugal force to move within the interior of the rotor 26, making contact with the coils and with the interior facing surfaces of the opposed side walls 55 and 56 and the interior facing surfaces of the inner end wall 58 and outer end wall 59. This tends to transmit the heat of the coils to the walls of the rotor, so as the rotor moves away from and then back toward the stator, the cooling fins 64 and the external surfaces of the walls of the rotor tend to shed their heat.

As shown in FIG. 4, stator 52 includes stator halves 70 and 71 that are positioned on opposite sides of the path of the rotor 26 as the rotor rotates on the turbine wheel 22. Stator halves 70 and 71 may be substantially identical and each includes a substantially cup-shaped stator housing 72 having its opening 74 facing the opposed side walls 55 and 56 of the rotor 26. The edges 76 about the cup-shaped stator housings each have a flat rim facing said rotor, the rims are shaped for forming the air escaping from the stator housings into a film of air between each stator housing and the rotor, such that an air bearing is formed between the stator housings and the rotor. The air bearing reduces the friction between the rotor and the stators.

The coils 80 of the stator halves are maintained in juxtaposition with the rotor 26 by the stator housings 72.

A space 82 is formed in the cup-shaped stator housing behind the stator coils 80, with the space forming an air passage for the movement of air through the coils of the stator. An air conduit 84 communicates with the space 82 of each stator housing 72 to supply air to the air passage 82 behind the stator coils 80 so that the air moves from the air passage through the stator coils, cooling the stator coils. After the air moves through and about the stator coils the air passes between the flat face of the rotor 26 and edges 76 of the cup-shaped stator housing 72. As the air passes the edges 76 of the cup-shaped stator housings 72, the air forms an air bearing between the stator housings 72 and the facing surfaces of the rotor 26. The air moving from the edges of the stator housings forms the air bearing against the flat facing surface of the rotor 26 that assures that the stator housings will not frictionally engage the surfaces of the rotor.

The turbine wheel may be of very large diameter, in excess of 100 feet in diameter. When the turbine wheel of such great size is rotated, it is likely that the rotor segments 26 will not follow exactly the same paths, such that the stator assembly 52 may experience a lateral wobbling motion of the rotor as the rotor segments move through the stator and/or the rotor moves shallower or deeper into the stator assembly 52. Because of the likelihood of this movement, it is desirable to have the stator move laterally in response to the lateral motions of the rotor, and it is desirable to have the rotor built with a height that is greater than the height of the stator so that the stator can always be in the electrical field of the coils of the rotor.

Figure 3:
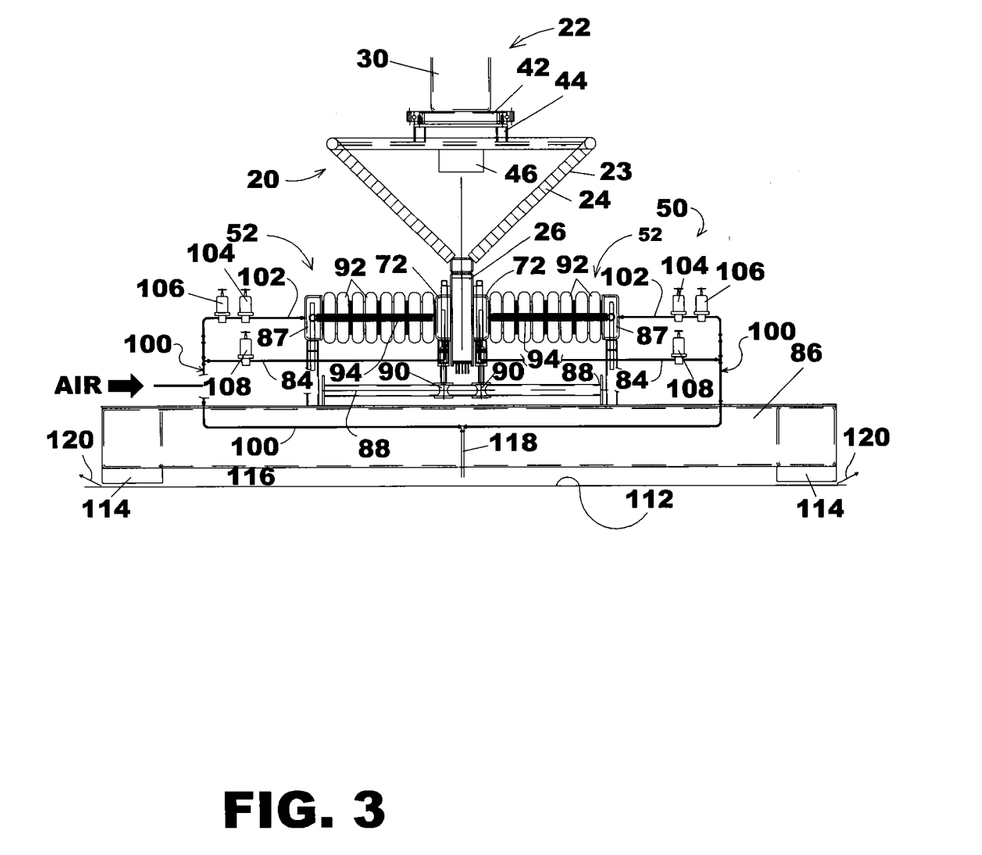
FIG. 3 is a closer view of the electrical generator shown in FIG. 2.

As shown in FIG. 3, in order to accommodate the likely lateral motion of the rotor 26, the stator assembly 52 includes a support platform 86, with a support frame having stator support rails 88 mounted on the support platform. The stator housings 72 are mounted on the support rails 88 by means of rollers, such as rollers 90 that may travel along the stator support rails 88.

Inflatable bellows 92 are positioned on the closed sides of the stator housings 72. The bellows 92 are in the shape of air bags connected at one end each to a stator housing 72 and supported at the distal ends by the support frame 87 of the stator. When the bellows 92 are inflated, they urge the stator housings 72 toward engagement with the rotor 26, with the air bearing at the edges of the stator housings helping to avoid the stator housings from contacting the rotor. Equal pressures are maintained in the inflatable bellows 92 on both sides of the stator housings so that when the rotor moves laterally, the bellows tend to urge the stators in the same lateral direction of movement of the rotor. Thus, the air bags function as a first biasing means engaging said stator housings for urging said stators toward said rotor.

In order to assure that the stators will relieve their force toward the rotor at times when the generator is to be deactivated, coil tension springs 94 extend from the lateral support structure 87 to the stator housings 72, tending to urge the stator housings away from the rotor. Thus, the springs function as a second biasing means engaging said stator housings for urging said stators away from said rotor.

FIG. 3 illustrates the air supply system for the stator assembly 52. An air supply device of conventional design (not shown) communicates with the air conduit system 100. The air flows to the inflatable bellows 92 through conduits 102 at opposite ends of the stator, through an air pressure regulator 104, and an air pressure release valve 106, to the series of bellows 92. The air pressure to the bellows is regulated by the air pressure regulators 104 to apply the stator housings 72 toward the rotor 26, with equal pressure applied to the bellows on both sides of the rotor.

Air pressure relief valves 106 function to discharge the air from the bellows 92 when the air pressure drops below a predetermined value. This allows springs 94 to move the stator housings away from the rotor when air pressure is depleted.

Likewise, the air pressure control valves 108 control the movement of air through conduit 84 to the stator housings 72 as previously described. This maintains the cooling of the stator coils and establishes the air bearing at the edges of the cup-shaped stator housings with respect to the facing surfaces of the rotor 26.

While it is anticipated that the above described adjustable positioning features of the stator will be sufficient to have the stator housings accurately follow the lateral movements of the rotor, the air from the air source (FIG. 3) also may be used to form an air bearing between the support platform 86 and its support surface 112. The perimeter of the support platform 86 is formed with a downwardly extending rim 114 that forms a closed space 116 between the bottom surface of the support platform 86 and the upwardly facing surface 112 of the support. Air is moved through the downwardly extending conduit 118 to the space 116, generating enough upward force to tend to lift the support platform, thereby forming spaces beneath the perimeter rim 114 with the movement of escaping air 120. The escaping air 120 forms an air bearing beneath the support platform 86, allowing it to move in lateral directions, following the lateral motions of the rotor 26.

Figure 7:
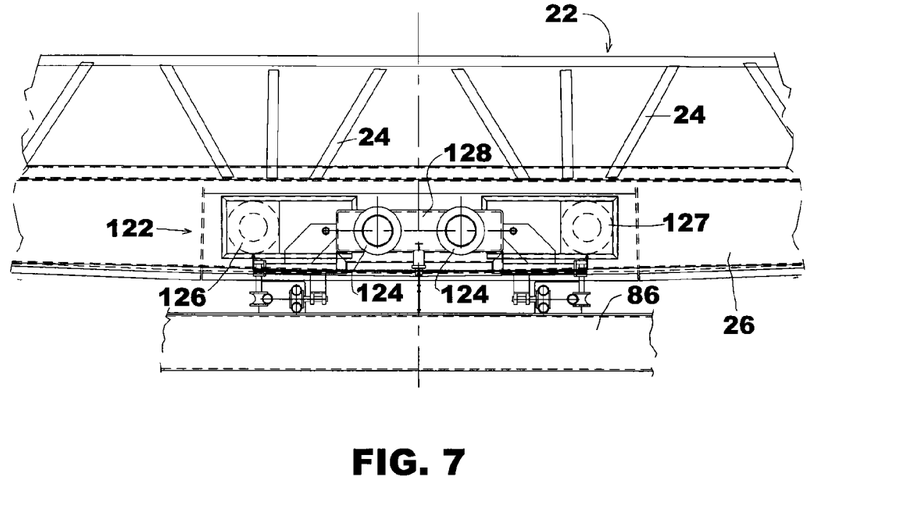
FIG. 7 is an end view of another embodiment of the stator as applied to the outer perimeter rail that functions as a rotor, with pairs of air bearings displaced on opposite sides of the stator.

FIG. 7 illustrates a modified stator assembly 122 that includes inflatable air bellows 124 that urge the stator halves toward the rotor 26, but the air bearing is displaced laterally from the stator halves. A pair of air bearings 126 and 127 are supported by the stator halves, such as stator half 128, so that the air bearings 126 and 127 are movable in unison with their respective stator half. The air bearings are displaced laterally from each other and from the stator housings so as to assure more perfect alignment of the stator housings with the moving rotor surfaces.

Figure 1B:
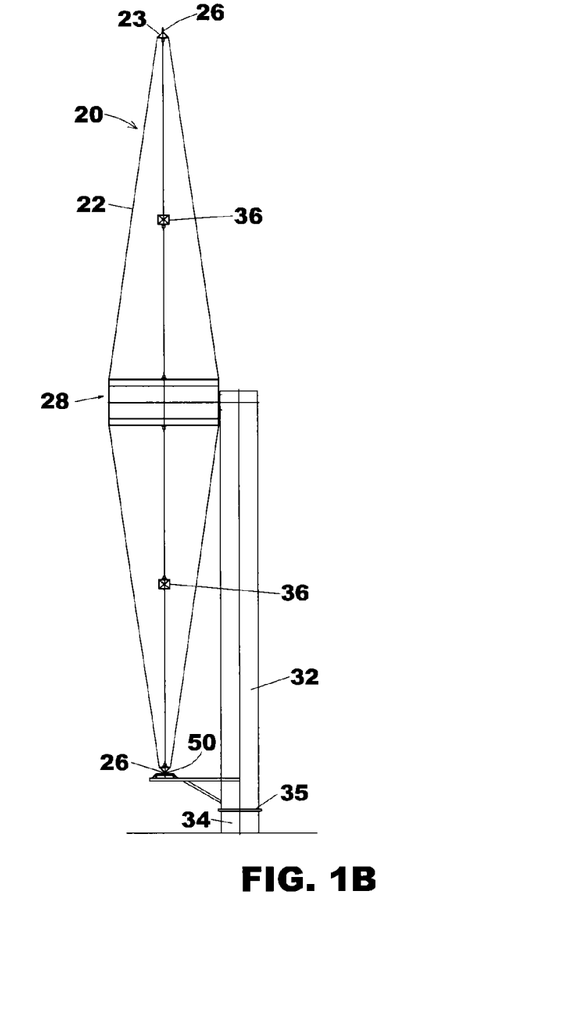
FIG. 1B is a side elevational view of the wind turbine of FIG. 1A.
Figure 1C:
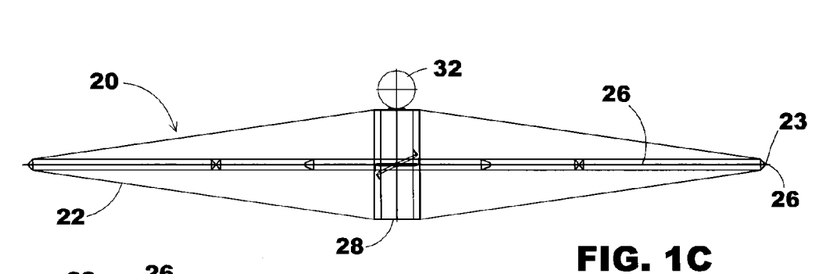
FIG. 1C is a top view of the wind turbine of FIGS. 1A and 1B.
Figure 8A:
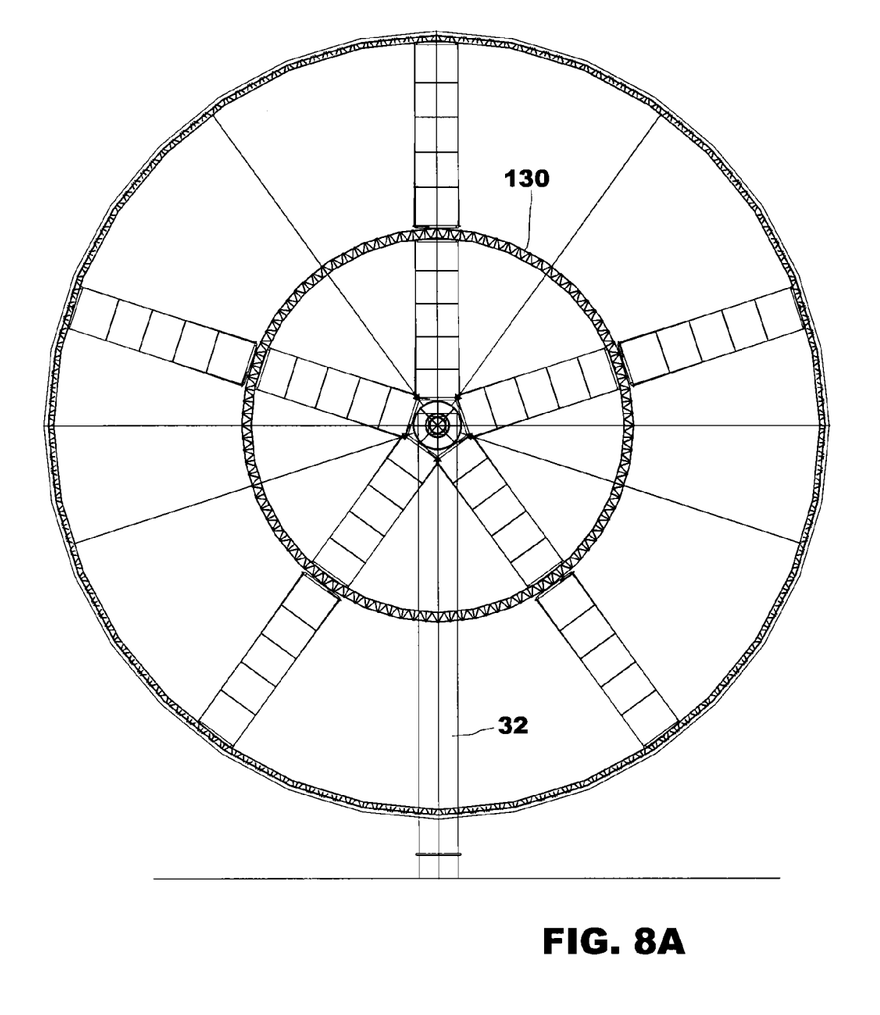
FIGS. 8A, 8B, and 8C are similar to FIGS. 1A, 1B, and 1C except that FIGS. 8A, 8B and 8C disclose a wind turbine having an intermediate circular rail with electrical generators applied to the intermediate circular rail.
Figure 8B:
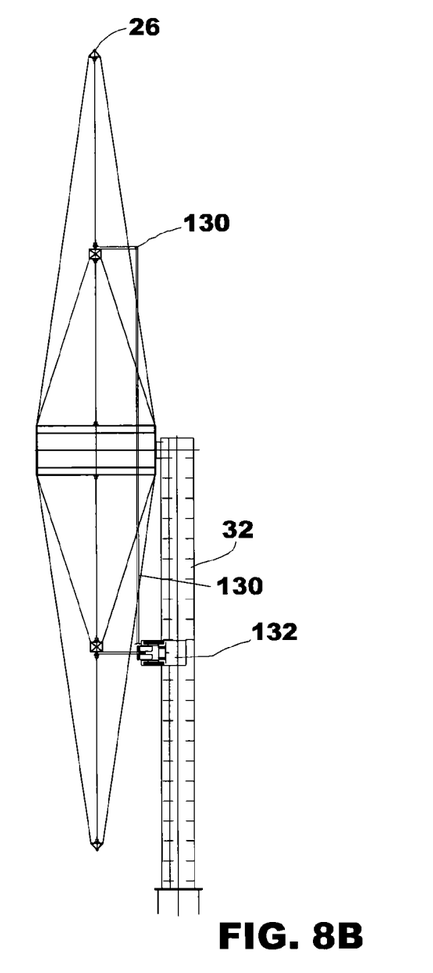
Figure 8C:
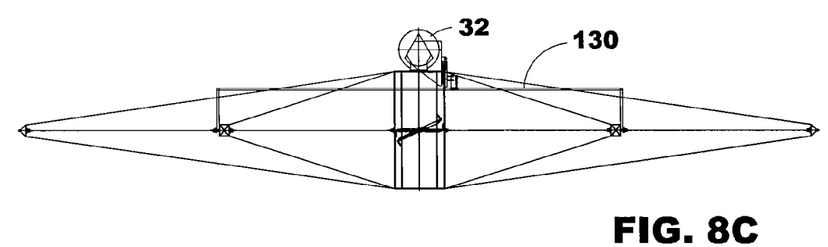
Figure 9:
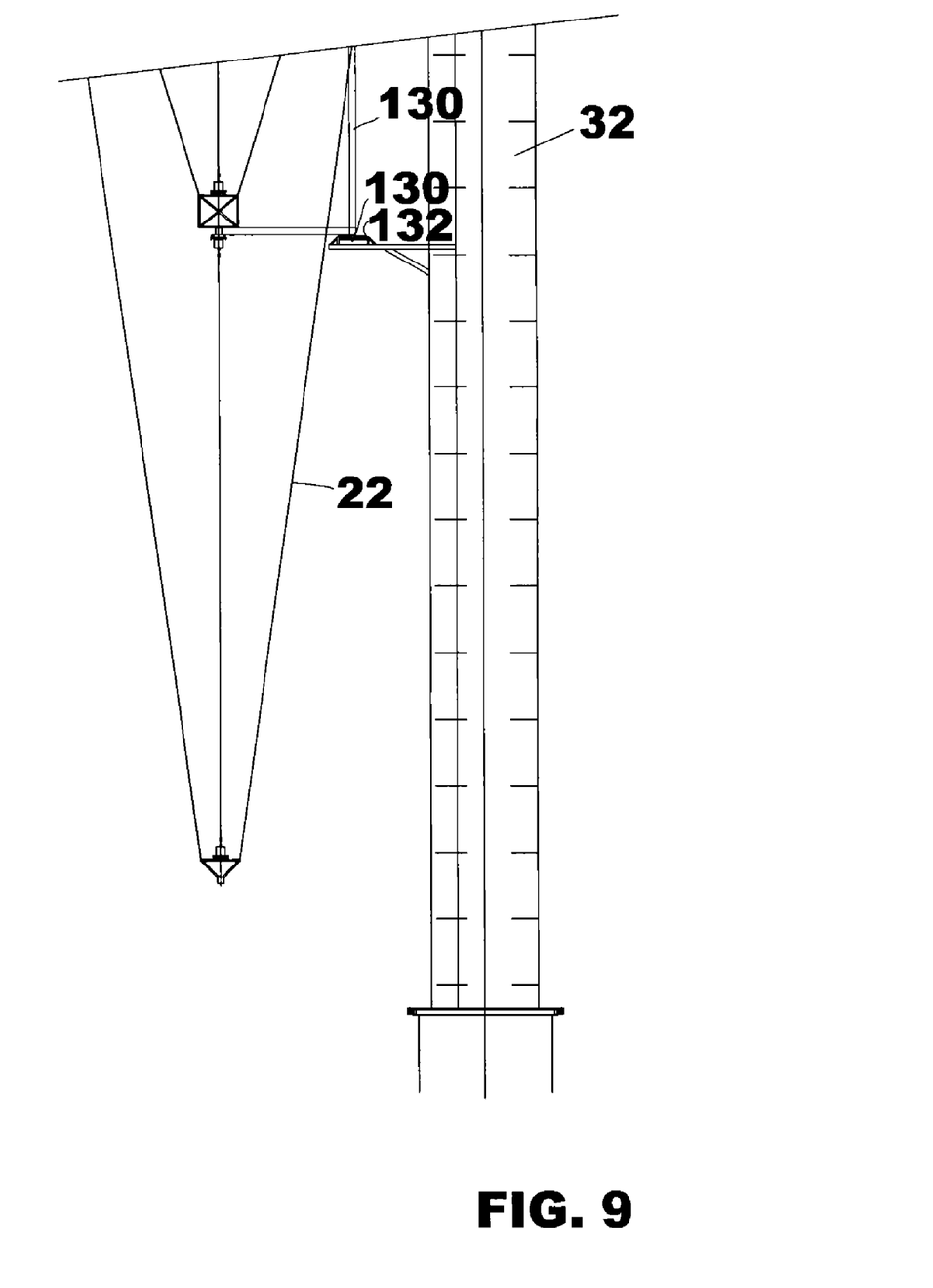
FIG. 9 shows the electrical generator of FIG. 8.

FIGS. 8A, 8B, and 8C illustrate an air turbine wheel that includes an inner rail 130. Inner rail 130 is circular and is concentric with rotor 26 of the prior figures. Like the outer perimeter circular rail 26 of FIGS. 1 and 3, the inner rail 130 may be formed with the coils of a rotor, and a floating stator assembly 52 of the type illustrated in FIGS. 2-5 may be applied to the inner rail 130. The inner rail 130 of the turbine wheel 22 is displaced laterally of the main portion of the turbine wheel, adjacent the mast 32, as shown in FIGS. 8B and 8C. As shown in FIG. 9, the stator 132 may be positioned to receive the inner rail 130 for generating electricity.

While FIG. 2 shows the electrical generator 50 at the perimeter rail 26 and FIG. 9 shows the electrical generator 132 at the inner rail 130, it is possible to have electrical generators mounted at both the perimeter rail and the inner rail. With this double arrangement, the electrical generator at the inner rail may be used in high velocity winds where the movement of the rotor through the stator is relatively slow, and the electrical generator at the outer rail may be used in slow velocity winds where the movement of the rotor through the stator is relatively high.

Figure 10:
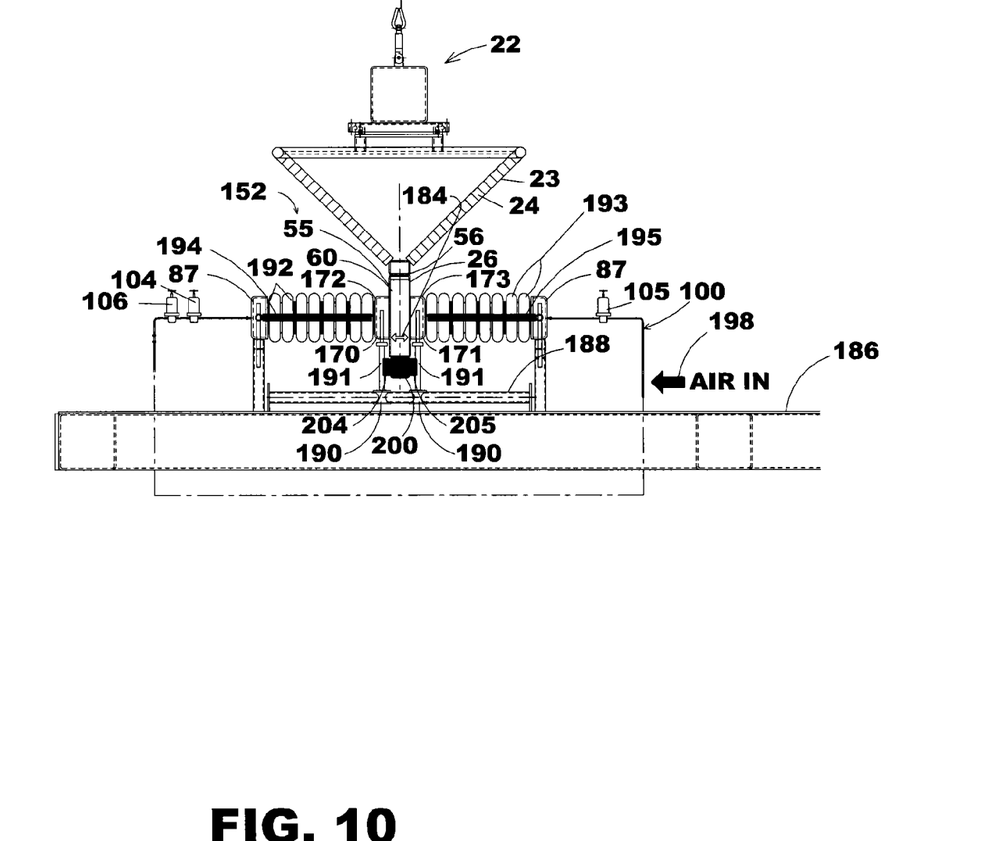
FIG. 10 is a side view of a stator, similar to the stator of FIGS. 2-7, but showing another embodiment of the invention.

FIGS. 10-13 illustrate another embodiment of an electrical generator. FIG. 10 shows electrical generator 152 that includes an outer perimeter circular rail 26 that extends continuously about the turbine wheel. The outer perimeter circular rail 26 may be formed of a series of arcuate segments, as previously described. The outer perimeter circular rail functions as the rotor of an electrical generator.

As shown in FIG. 10 stator 152 includes stator halves 170 and 171 that are positioned on opposite sides of the path of the rotor 26 as the rotor rotates on the turbine wheel 22. Stator halves 170 and 171 may be substantially identical and each includes a substantially cup-shaped stator housing 172, 173 having an opening 174 facing each other and the opposed side walls 55 and 56 of the rotor 26. The edges 176 about the cup-shaped stator housings each may have a flat rim facing said rotor.

Figure 11:
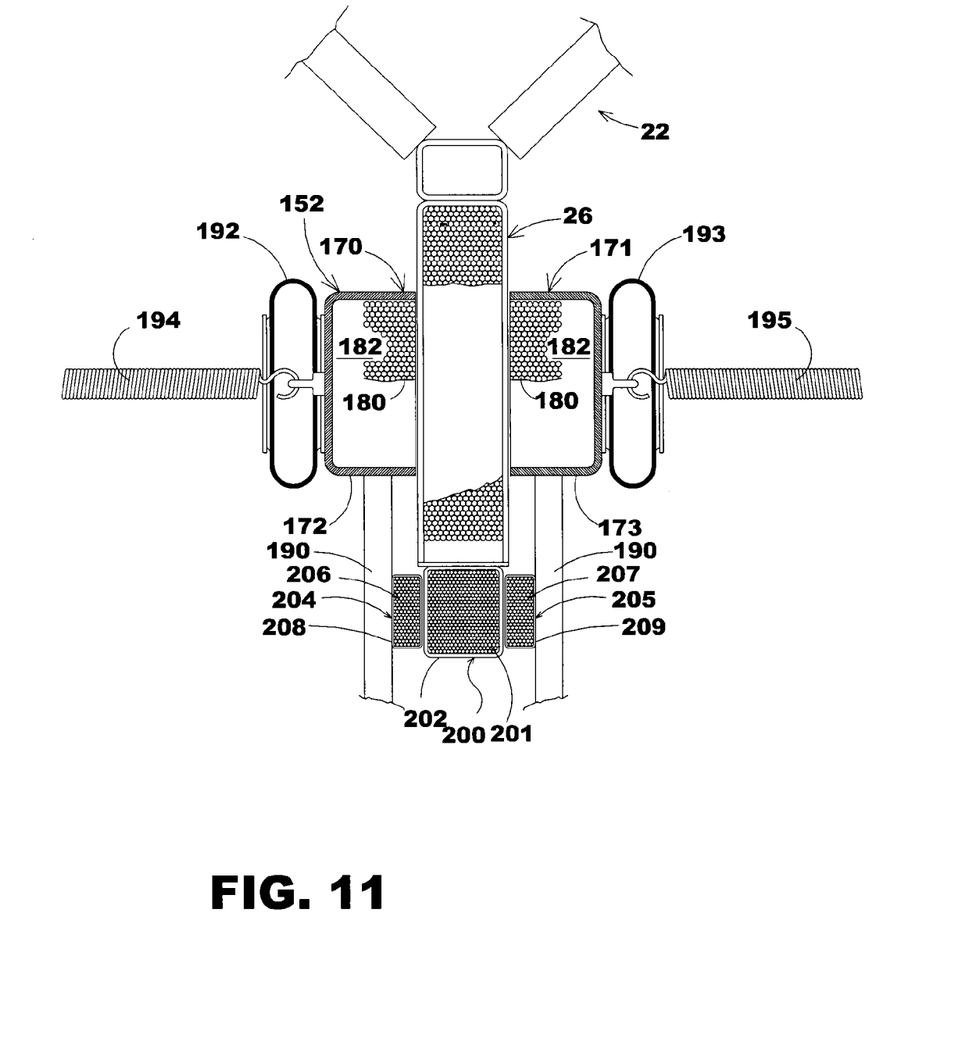
FIG. 11 is a closer side view of the second embodiment of FIG. 10, but showing the magnets in greater detail.

As shown in FIG. 11, the coils 180 of the stator halves are maintained in juxtaposition with the rotor 26 by the stator housings 172 and 173.

A space 182 may be formed in the cup-shaped stator housings behind the stator coils 180, with the space forming an air passage for the movement of air through the coils of the stator. An air conduit may communicate with the space 182 of each stator housing 172 and 173 to supply air behind the stator coils 180 so that the air moves from the air passage through the stator coils, cooling the stator coils.

Since the turbine wheel may be of very large diameter, in excess of 100 feet in diameter, when the turbine wheel is rotated, it is likely that the rotor segments of rotor 26 will not follow exactly the same paths, such that the rotor segments may experience a lateral wobbling motion as the segments of the rotor move through the stator housings 172 and 173, and/or move shallower or deeper into the stator assembly 152.

As shown in FIG. 10, in order to accommodate the likely lateral motion of the rotor 26 as indicated by double headed arrow 184, the stator assembly 152 includes a support platform 186, with a support frame having stator support rails 188 mounted on the support platform. The stator housings 172, 173 are mounted on the support rails 188 by means of vertical support stanchions 191 that are supported at their lower ends by rollers, such as rollers 190 that travel along the stator support rails 188. Inflatable bellows 192, 193 are positioned on the closed sides of the stator housings 172, 173, respectively. The bellows 192, 193 are in the shape of a series of air bags connected at one end each to a stator housing 172 and supported at the distal ends by the support frame 188 of the stator. When the bellows 192, 193 are inflated, they urge the stator housings 172, 173 toward engagement with the rotor 26. Equal pressures are maintained in the inflatable bellows 192, 193 with equal air pressure in the bags on both sides of the stator housings so that when the rotor moves laterally, the bellows tend to urge the stators in the same lateral direction of movement of the rotor segments. The air bags function as a first biasing means engaging said stator housings for urging said stators toward said rotor.

In order to assure that the stators will relieve their force toward the rotor at times when the generator is to be deactivated, coil tension springs 194, 195 extend from the lateral support structures 187 at opposite ends of the stator assembly to the stator housings 172, 173, tending to urge the stator housings away from the rotor. Thus, the springs 194,195 function as a second biasing means engaging said stator housings for urging said stators away from said rotor.

FIG. 10 illustrates the air supply system for the stator assembly 152. An air supply device 198 of conventional design communicates with the air conduit system 100. The air flows to the inflatable bellows 192, 193 through air conduit system 100 at opposite ends of the stator, through air pressure regulators 104 and 105, and at least one air pressure release valve 106, to the series of bellows 192. The air pressure to the bellows is regulated by the air pressure regulators 104, 105 to apply the stator housings 72 to the rotor 26, with equal pressure applied to the bellows on both sides of the rotor.

Air pressure relief valve 106 functions to discharge the air from the bellows 192, 193 under controlled conditions such as when the air pressure drops below a predetermined value. This allows springs 94 to move the stator housings away from the rotor when air pressure is depleted.

Figure 12:
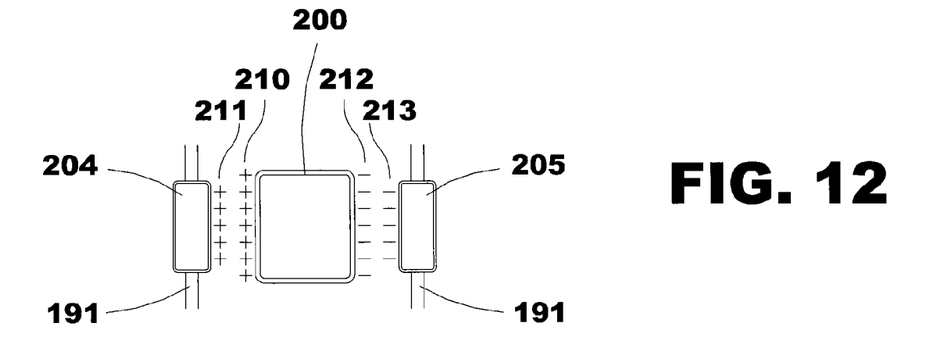
FIGS. 12 and 13 are schematic views illustrating the magnetic fields when the rotor magnet is moved laterally with respect to the stator magnets.

While FIGS. 2-7 disclose the use of moving air between the edges of the cup shaped stator housings to form an air bearing between the oppositely facing surfaces of the rotor 26 to retard wear by the stators on the rotor, FIGS. 10-12 show a magnet assembly with the rotor and the stators that may be used to maintain the desired close spacing of the stators with the rotor.

The rotor shown at 26 in FIGS. 11 and 12 has a series of rotor magnets 200 formed by rotor coil windings 201 confined in a series of rotor windings enclosures 202. The series of rotor magnets 200 are mounted on the periphery of the rotor 26. The rotor magnets rotate in unison with the rotor and are connected to a source of electricity (not shown), either a battery or a live source.

As shown in FIG. 11, at least one pair of stator magnets 204 and 205 Is provided with each of the pair positioned on opposite sides of the rotor magnets 200. The stator magnets 204 and 205 include stator coil windings 206 and 207 positioned on opposite sides of the rotor magnets and they are supported by enclosures 208 and 209. The stator magnets also are mounted on the same vertical support stanchions 190 that support the cup shaped stator housings 172 and 173 on the rollers 190 so that they move in unison with the cup shaped stator housings 172 and 173.

As shown schematically in FIG. 12, the windings in the stator magnets 204 and 205 are wound so as to develop a magnetic fields 211 and 213 adjacent the rotor magnets 200 that is the same polarity as the adjacent magnetic fields 210 and 212 developed by the rotor magnets. For example, the left side of the rotor magnets 200 develop a positive magnetic field 210 and the left stator magnet 204 also develops on its right side a positive field 211 facing the rotor magnet, causing these magnetic fields to repel each other. Likewise the right side of the rotor magnets 200 develop negative magnetic field 212 and the right stator magnet 205 also develops on its left side a negative magnetic field 213, causing these magnetic fields to repel each other. The repelling forces of the rotor magnets 200 with respect to the stator magnets 204 and 205 cause the stator magnets to urge the stanchions 191 and stator halves 170 and 171 away from the rotor 26, while the bellows 192 and 193 continue to urge the stator halves 170 and 171 toward the rotor 26.

Figure 13:
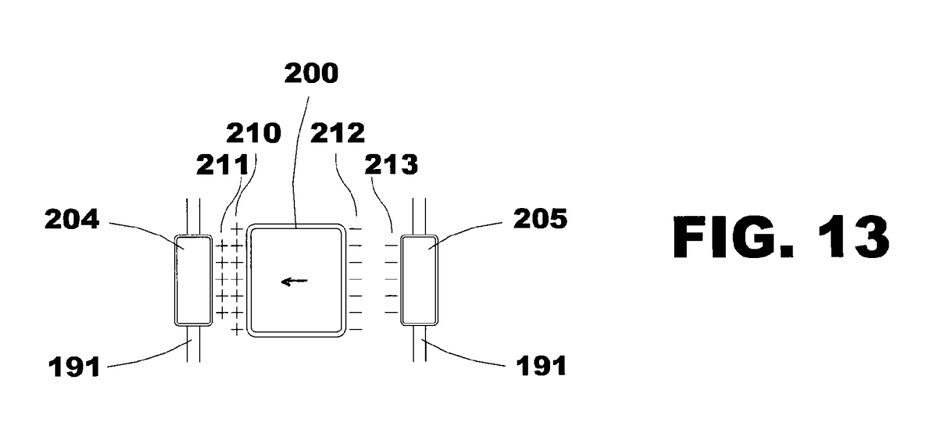

When the rotor magnets 200 shift laterally to the left as shown in FIG. 13, the narrowing of the left gap between the rotor and the left stator magnet 204 tends to rapidly increase the effect of the opposing positive forces applied by the magnetic fields 210 and 211. In the meantime, the widening of the gap between rotors 200 and right stator magnet 205 tends to rapidly decrease the effect of the opposing negative forces applied by their magnetic fields. Since the forces applied by the bellows is substantially constant for a constant air pressure in the bellows, the magnetic field can accurately reposition the stator housings from the rotor 26. Thus, the rotor magnets and stator magnets form magnet means that cooperate to form magnetic bearings that maintain the stator in juxtaposition with said rotor in response to the lateral movement of said rotor.

It will be understood by those skilled in the art that while the foregoing description sets forth in detail preferred embodiments of the present invention, modifications, additions, and changes might be made thereto without departing from the spirit and scope of the invention, as set forth in the following claims.

The invention claimed is:

1. An electrical generator for a wheel mounted for rotation on a horizontal axis, said electrical generator comprising:
   a circular rotor mounted on said wheel and extending concentrically about the horizontal axis for rotation with the wheel in a circular path about the horizontal axis,
   a stator positioned at the circular path of said rotor shaped for receiving said rotor and generating electricity in response to the rotation of said rotor,
   support means for movably supporting said stator, and
   a magnet for moving said stator on said support means toward juxtaposition with said rotor in response to lateral movement of the rotor.

2. The electrical generator of claim 1, wherein said magnet includes
   a series of rotor magnets mounted on said rotor with windings that develop a magnetic field, and
   a pair of opposed stator magnets positioned on opposite sides of said circular path including windings that develop magnetic fields that oppose the magnetic fields of said rotor magnets.

3. The electrical generator of claim 2, and wherein said rotor is formed in series of arcuate segments.

4. The electrical generator of claim 2, and further including first biasing means engaging said stators for urging said stators toward said rotor.

5. The electrical generator of claim 4, and wherein said first biasing means comprises inflatable air bags.

6. The electrical generator of claim 4, and further including second biasing means engaging said stators for urging said stators away from said rotor.

7. The electrical generator of claim 6, and wherein said second biasing means comprises a spring.

8. The electrical generator of claim 2, and further including a spring in biased relationship with each of said stators for urging each of said stators away from said rotor, and inflatable air bags in biasing relationship with each of said stators configured for urging said stators toward said rotor.

9. The electrical generator of claim 2, and wherein said wheel is a wind turbine and includes a plurality of radially extending sails for catching the wind.

10. An electrical generator for a wheel mounted for rotation on a horizontal axis, said electrical generator comprising:
    a circular rotor mounted on said wheel and extending concentrically about the horizontal axis for rotation with the wheel in a perimeter path about the horizontal axis, said circular rotor including radially extending opposed sides,
    a stator positioned at the perimeter path of said rotor, said stator shaped for receiving said rotor and configured for generating electricity in response to the rotation of said rotor,
    stator support means movably supporting said stator in response to lateral movements of said rotor at said stator, and
    a magnet movable with said stator juxtaposed said rotor and configured for maintaining said stator in juxtaposition with said rotor.

11. The electrical generator of claim 10, wherein
    said stator includes a pair of opposed stator housings positioned on opposite sides of said rotor, said stator housings each including a field coil opening facing said opposed sides of said rotor, and field coils positioned in each of said stator housings and facing said rotor through said field coil openings.

12. The electrical generator of claim 10, and further including biasing means for selectively urging said stator housings toward each other and toward said rotor, and second biasing means for continuously biasing said stator housings away from each other and away from said rotor.

13. The electrical generator of claim 10 and wherein said magnet comprises a pair of magnets positioned on opposite sides of said rotor in opposite polarity than said rotor and configured to maintain space between each said stator housing and said rotor.

14. The electrical generator of claim 10, and wherein said rotor is formed in series of arcuate segments.

15. An electrical generator mounted for rotation on a horizontal axis, comprising:
    a circular rotor extending concentrically about the horizontal axis for rotation in a circular path about the horizontal axis, said circular rotor including radially extending opposed sides,
    a stator positioned at said radially extending opposed sides of said rotor, and
    magnetic means for moving said stator laterally in response to lateral movements of said rotor.

16. The electrical generator of claim 15 and further including
    first biasing means for selectively urging said stator toward said rotor and for relieving the urging of said stator toward said rotor, and
    second biasing means for continuously biasing said stator away from said rotor.

17. The electrical generator of claim 16 and wherein said first biasing means comprises inflatable air bags in biasing relationship with said stator configured for urging said stator toward said rotor.

18. The electrical generator of claim 16 and wherein said second biasing means comprises a spring in biased relationship with said stator for urging said stator away from said rotor.

19. The electrical generator of claim 16 and wherein said wheel is a wind turbine and includes a plurality of radially extending blades for catching the wind.

20. A method of generating electricity as described in claim 16, comprising generating a magnetic field with said rotor and urging said stator laterally with the magnetic field of said rotor.

21. An electrical generator for producing electricity comprising:
    an annular rotor formed by a series of rotor segments, said rotor segments including coils, and said rotor segments extending about a lateral axis of rotation and rotatable through an arc of an annular path, a stator positioned at said arc of said annular path of said segments, said stator including coils positioned on opposite sides of said arc of said annular path and shaped to receive there between said segments of said rotor, and magnet means for moving said stator laterally in response to lateral movements of said rotor.

* * * * *